United States Patent [19]

Cote

[11] 3,842,352

[45] Oct. 15, 1974

[54] COMMUNICATIONS SYSTEM HAVING SINGLE RF CHANNEL DIVERSITY MEANS

[75] Inventor: Walter E. Cote, Rome, N.Y.

[73] Assignee: The United States of America as represented by the Secretary of the United States Air Force, Washington, D.C.

[22] Filed: July 14, 1972

[21] Appl. No.: 271,944

[52] U.S. Cl. .............................. 325/56, 179/15 FD
[51] Int. Cl. .............................. H04b 7/02
[58] Field of Search .................. 325/40, 56, 59, 65; 343/200; 179/15 R, 15 FD, 15 FS

[56] References Cited

UNITED STATES PATENTS

| | | | |
|---|---|---|---|
| 2,880,275 | 3/1959 | Kahn | 325/56 |
| 3,409,875 | 11/1968 | Jager et al. | 325/59 |
| 3,526,837 | 9/1970 | Zegers et al. | 325/59 |

*Primary Examiner*—Benedict V. Safourek
*Assistant Examiner*—Jin F. Ng
*Attorney, Agent, or Firm*—Harry A. Herbert, Jr.; Willard R. Matthews

[57] ABSTRACT

Time diversity utilizing a single RF channel is achieved by duplicating the information bearing signal to be transmitted, delaying one duplicate signal, multiplexing the delayed and undelayed signals on an RF carrier and transmitting the multiplexed signal to a remote receiving station. At the receiving station the received signal is demultiplexed and the undelayed duplicate signal is delayed to bring it into time coincidence with the delayed duplicate signal. Subsequent combining of these signals provides a signal that is not subject to information loss due to fade or other interference for periods equal to or less than the delay time. A third delayed duplicate signal is also comprehended that obviates the effects of short and intermittent recovery time. In the preferred embodiment analog signals are transmitted by apparatus utilizing audio frequency delay lines and frequency division multiplexers and demultiplexers.

5 Claims, 2 Drawing Figures

PATENTED OCT 15 1974 3,842,352

COMMUNICATIONS SYSTEM HAVING SINGLE RF CHANNEL DIVERSITY MEANS

BACKGROUND OF THE INVENTION

This invention relates to communications systems employing diversity techniques and in particular to methods and means for accomplishing single channel time diversity in troposcatter, high frequency, line of sight and over communications systems.

Known diversity techniques include space, frequency, angle, polarization, modal, time and their various combinations. Their implementation to improve performance has been based on obtaining two or more independent RF paths which are to a large extent, but not completely, uncorrelated. However, there are significant percentages of time when all such channels fade simultaneously, thereby destroying the diversity advantage for such periods of time. In addition, present diversity systems require duplication of antennas, transmitters and receivers which add greatly to their cost and complexity.

Single channel time delay diversity has been used in the past. However, systems using this technique have had but limited success due to the problem of obtaining long time delays effectively at RF frequencies. State of the art delay lines at these frequencies can provide maximum delays to about 4 milliseconds. The practical achievement of longer delays of RF frequencies requires the use of magnetic recording and playback equipment and their inherent disadvantages.

There currently exists therefore the need to reduce the weight and complexity and increase the channel capacity of communications systems employing diversity techniques. The present invention is directed toward achieving these and other ends.

SUMMARY OF THE INVENTION

The present invention employs time delay diversity techniques. Each information bearing signal to be transmitted is directed by a multichannel transmission line into identical, substantially equal power signals. At least one of the signals is delayed and the delayed and undelayed signals are multiplexed on a signal RF carrier. The signal is then transmitted to a remote receiving station and demultiplexed. The demultiplexed information bearing signals are brought back into time coincidence and recombined. An operable device is realized by dividing the information bearing signal into two substantially equal power signals and using time delays in the order of 100 milliseconds. Improved performance is achieved by dividing the signal into three substantially equal power signals and delaying two of the signals prior to multiplexing. In this arrangement the use of a long delay time (approximately 100 milliseconds) and a short delay time (approximately 5 milliseconds) eliminates the effects of normal troposcatter fading and the loss of information due to short signal recovery times. The preferred embodiment of the invention comprehends an analog system utilizing audio frequency time delays and frequency division multiplexing.

It is a principal object of the invention to provide a new and improved communications system having single RF channel diversity means.

It is another object of the invention to provide a diversity system that does not require duplication of antennas, transmitters, and receivers.

It is another object of the invention to provide a tactical troposcatter communications system having reduced weight and complexity requirements and increased channel capacity.

It is another object of the invention to provide a time delay diversity system having time delays in the order of 100 milliseconds that does not require magnetic recording and playback equipment.

These, together with other objects, advantages and features of the invention will become more apparent from the following detailed description when taken in conjunction with the illustrative embodiments in the accompanying drawings.

DETAILED DESCRIPTION OF THE PREFERRED EMBODIMENTS

Figure 1:
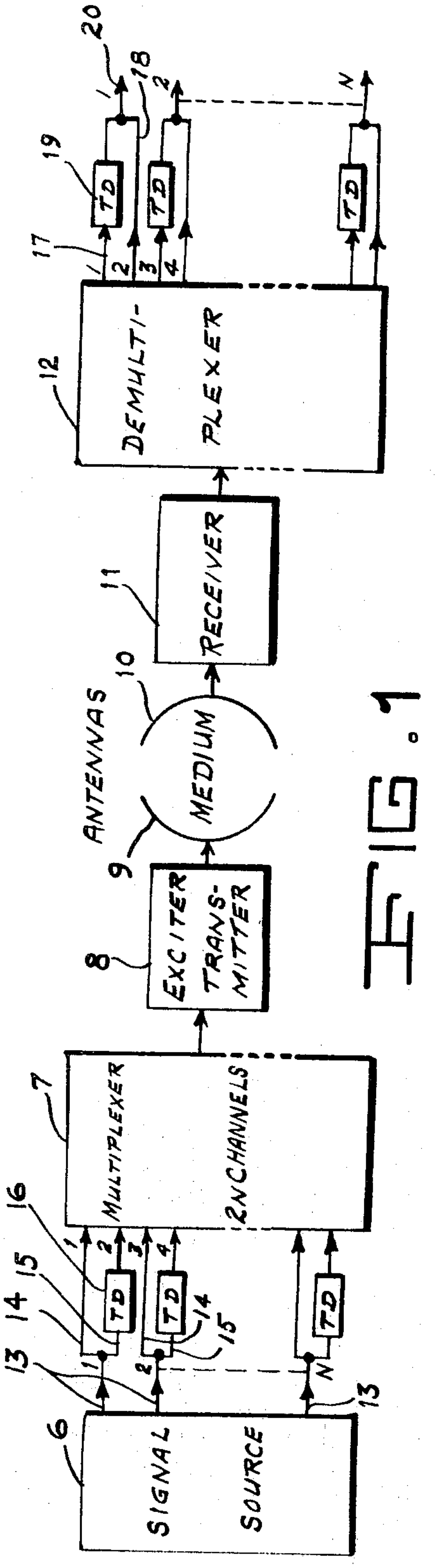
FIG. 1 is a block diagram of one embodiment of the invention wherein signals are divided into two substantially equal power component signals.

Referring now to FIG. 1, one or more information bearing signals are generated by signal source 6 and appear at output 13. The signals are divided with substantially equal power distribution by a multichannel transmission line comprising transmission lines 14 and 15. A fixed time delay 16 is inserted into transmission line 15. The information signal 1 appears at channel 1 of the multiplexer set by means of transmission lines 13–1 and 14. An identical signal, displaced in time by the time delay unit 16 appears at channel 2 of the multiplexer set by means of transmission lines 13–1 and 15. Thus, N different information signals occupy the 2N channel capacity of the multiplexer set 7. The multiplexer set 7 through its normal operation multiplexes or combines all the 2N channel inputs into a single baseband output. The signal output of multiplexer 7 is transmitted to a remotely located receiving station by means of exciter transmitter 8 and transmitting antenna 9. At the remotely located receiving station the signal so transmitted is received by receiving antenna 10 and receiver 11. The received signal is then demultiplexed by means of demultiplexer 12. The undelayed demultiplexed signal (multiplex channel 1) is then delivered to a first transmission line 17 having a fixed time delay 19. The delayed demultiplexed signal is delivered to transmission line 18. Fixed time delay 19 is equal to fixed time delay 16 and brings the two component signals back into time coincidence prior to being recombined on transmission line 20.

Figure 2:
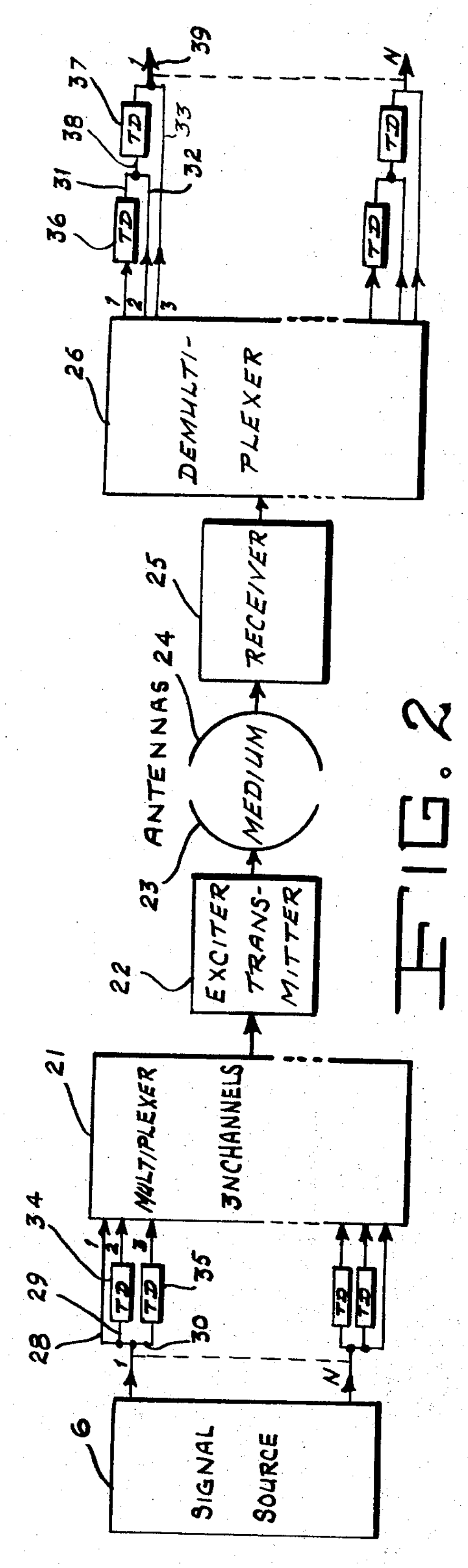
FIG. 2 is a block diagram of another embodiment of the invention wherein signals are divided into three substantially equal power component signals.

An alternative embodiment of the invention is illustrated by the block diagram of FIG. 2. The outputs of signal source 6 are in this instance delivered to a multichannel transmission line comprising transmission lines 28, 29 and 30. Transmission lines 29 and 30 are provided with fixed time delays 34 and 35 respectively with time delay 35 being large with respect to time delay 34. The three signals are then multiplexed by multiplexer 21 and transmitted to a remote receiving station by means of exciter transmitter 22 and transmitting antenna 23. Multiplexer 21 can be either a frequency division multiplexer or a time division multiplexer. Examples of frequency division multiplexer sets are the AN/MCC-12, the AN/FCC-17, the AN/UC- C-4, Lenkurt type 45BX or Western Electric K and L carrier systems. Examples of time division multiplexer sets are the TD-660, the TD-968 and the AN/GSC-24. The signals are received by receiving antenna 24 and receiver 25 and are demultiplexed by means of demultiplexer 26. The undelayed demultiplexed signal (multiplex channel 1) is delivered to a transmission line 31 having a fixed time delay 36. Fixed time delay 36 is equal to fixed time delay 34 and brings the signals on multiplex channels 1 and 2 into time coincidence. These signals are then combined on transmission line 38. This combined signal is delayed by fixed time delay 37 and recombined with the delayed demultiplexed signal on transmission line 33 (multiplex channel 3) by combining transmission lines 33 and 38 with transmission line 39. Fixed time delay 37 has a delay time adapted to bring the signals back into time coincidence and is equal to the difference between fixed time delay 35 and fixed time delay 34.

By way of a practical example, fixed time delay 16 of 100 milliseconds and multichannel transmission lines 14, 15 are used to split the incoming information signal into two channels of equal power. The undelayed information signal is inserted into multiplex channel 1 while the 100 milliseconds delayed information signal is inserted into multiplex channel 2 (the adjacent frequency slot or group in an FDM multiplexer). The narrow frequency slots adjacent to each other assure that these two channels are for all intents and purposes completely correlated. This relationship holds for frequency spacings to 100 KHz. With multiplex channels 1 and 2 now transmitted over some path simultaneously in time on one RF carrier, a fade duration in the RF carrier of 100 milliseconds or less will cause the amplitude to drop in the undelayed channel as well as the RF received signal lever. However, at the end of the 100 milliseconds period, the received level recovers to the selected level and the information delayed by 100 milliseconds is now received. By inserting an identical delay of 100 milliseconds into the demultiplex channel 1 output (which was transmitted undelayed) to bring the information signal back into time synchronism with multiplex channel 2 output before combining with channel 2, it can be seen that although the carrier is lost for 100 milliseconds or less, no information transmitted is lost under these circumstances. This assumes that the received carrier stays above the selected level for more than 100 milliseconds so that the same information is not lost due to a succeeding fade. This is the normal case and holds for a great percentage of time. For the small percentage of time that a high fade rate is encountered, that is, the RF carrier stays above the level selected for shorter periods, the implementation of the embodiment of FIG. 2 would provide even greater diversity advantage. Here using a time delay of 5 milliseconds for time delay 34 and 100 milliseconds for time delay 35, one is assured that information is recovered when the carrier level recovers for only 5 milliseconds periods and would be of value for the rapid fading conditions such as those caused by aircraft effects. However, for these specific values of time delays 34 and 35 in FIG. 2, it can be seen that three multiplex channels are required for each diversity channel and further one different time delay 37 of 95 milliseconds is now required to resynchronize all three channels in time to gain the added diversity advantage.

For most tactical troposcatter systems, the implementation of the embodiment of FIG. 1 would be adequate. The length of time delay selected would depend upon the operating frequency of the system which affects the fade rate. In addition, to minimize the length of the time delay, one can introduce intentional antenna misalignment to increase the fade rate and thereby, reduce the duration of fade below a given level and the required time delay per hop.

For the case of FIG. 1 discussed above, it has been demonstrated that 50 percent of all fades below the median level last 100 milliseconds or less; therefore, one expects a 100 milliseconds delay to maintain the "effective" median level for 75 percent of the time rather than the nondiversity 50 percent of the time (i.e., without the 100 milliseconds delay). However, this same delay of 100 milliseconds, taken at 10 db below the median level, shows that the reliability or time availability above this level would be about 94–95 percent. However, if one designs the system to maintain a sufficiently high median level that allows 15 db fades one can see that 99 percent of the fades would be equal to 100 milliseconds or less resulting in a system reliability of 99 percent above the selected level, i.e., 15 db below a designed median value.

In addition, it should be noted that for those very few fades which exceed 100 milliseconds in duration, their effective duration is reduced by 100 milliseconds and the effective depth of fade is reduced as well. This form of diversity implementation disclosed herein can also be combined with any of the various other diversity techniques mentioned above when system advantages obtain and for some systems requiring extreme reliabilities. This technique applied to digital systems can be implemented at less cost since time delays in the form of integrated circuit shift registers are much less expensive than analog time delays.

This invention will improve the performance of all communications systems which operate through a time varying medium to any desired possible level by uniquely applying time delay to obtain the highest possible degree of diversity over a single RF channel. The specific implementation disclosed herein is discussed as it applies to analog troposcatter channels although it is obviously and equally applicable to digital troposcatter channels using either FDM or TDM multiplexer sets and to systems other than troposcatter, e.g., H.F., LOS, ionoscatter, etc.

Accordingly, while the invention has been described in its preferred embodiments, it is understood that the words which have been used are words of description rather than words of limitation and that changes within the purview of the appended claims may be made without departing from the scope and spirit of the invention in its broader aspects.

What is claimed is:

1. A communications system comprising at a transmitting station;

a signal source, first, second and third transmission lines, each said transmission line being connected to receive simultaneously signals generated by said signal source, a first time delay means disposed in said second transmission line, a second time delay means disposed in said third transmission line, a multiplexer adapted to multiplex the signals on each transmission line onto a signal RF carrier; and a communications transmitter connected to the output thereof for transmitting said multiplexed signals to a remote receiving station, and at said remote receiving station, a communications receiver adapted to receive said transmitted multiplexed signals, a demultiplexer connected thereto, a fourth transmission line connected to the output of said demultiplexer to receive undelayed demultiplexed signals, fifth and sixth transmission lines connected to the output of said demultiplexer to receive delayed demultiplexed signals, a third time delay means disposed in said fourth transmission line, means for combining the signals on said fourth and fifth transmission lines, a seventh transmission line connected to receive the combined signals of said fourth and fifth transmission lines, a fourth time delay means disposed in said seventh transmission line, said third and fourth time delay means being adapted to bring the demultiplexed signals on said fourth, fifth and sixth transmission line into time coincidence, and means for combining the signals on said sixth and seventh transmission lines.

2. A communications system as defined in claim 1 wherein said signal source generates information bearing analog signals.

3. A communications system as defined in claim 2 wherein said multiplexer is a frequency division multiplexer and said demultiplexer is a frequency division demultiplexer.

4. A communications system as defined in claim 3 wherein said first, second, third and fourth time delay means are audio frequency delay lines.

5. A communications system as defined in claim 4 wherein said first and third time delay means are audio frequency delay lines having delay times in the region of 5 milliseconds, said second delay means is an audio frequency delay line having a delay time in the region of 100 milliseconds and said fourth time delay means is an audio frequency delay line having a delay time in the region of 95 milliseconds.

* * * * *